United States Patent
Wang et al.

(10) Patent No.: US 11,842,825 B2
(45) Date of Patent: Dec. 12, 2023

(54) VORTEX-PAIR BEAM BASED OPTICAL TWEEZER SYSTEM

(71) Applicant: ZHEJIANG UNIVERSITY, Zhejiang (CN)

(72) Inventors: Ligang Wang, Zhejiang (CN); Jisen Wen, Zhejiang (CN); Binjie Gao, Zhejiang (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 163 days.

(21) Appl. No.: 17/422,572

(22) PCT Filed: Nov. 30, 2020

(86) PCT No.: PCT/CN2020/132674
§ 371 (c)(1),
(2) Date: Jul. 13, 2021

(87) PCT Pub. No.: WO2021/135782
PCT Pub. Date: Jul. 8, 2021

(65) Prior Publication Data
US 2022/0215980 A1 Jul. 7, 2022

(30) Foreign Application Priority Data
Jan. 3, 2020 (CN) .......................... 202010005566.9

(51) Int. Cl.
*G21K 1/00* (2006.01)
(52) U.S. Cl.
CPC ................................... *G21K 1/006* (2013.01)

(58) Field of Classification Search
CPC ........ G21K 1/006; G02B 26/02; G02B 26/06; G02B 21/0088; G02B 21/06; G02B 21/36; G02B 21/32; G02B 27/00
(Continued)

(56) References Cited

U.S. PATENT DOCUMENTS

| 7,433,044 | B1 | 10/2008 | Szarmes et al. |
| 2008/0121790 | A1* | 5/2008 | Grier .................... G03H 1/2294 359/9 |
| 2020/0309761 | A1* | 10/2020 | Massingham .......... G06N 3/045 |

FOREIGN PATENT DOCUMENTS

| CN | 103954367 A | 7/2014 |
| CN | 103983367 A | 8/2014 |

(Continued)

*Primary Examiner* — Kiet T Nguyen
(74) *Attorney, Agent, or Firm* — Nitin Kaushik

(57) ABSTRACT

The present disclosure discloses a vortex-pair beam based optical tweezer system, including a laser device (1), a collimating beam expanding system, a spatial light modulator (6), a confocal beam shrinking system, a sample table (12), and an observation unit arranged according to a light path. The spatial light modulator (6) continuously loads different vortex-pair beam phase diagrams in real time, and manipulates and rotates a particle in real time by using a single vortex-pair beam. The optical tweezer system can realize precise regulation, control, and positioning of two spherical particles at any positions in a plane, and any controllable rotation operation of a rod-shaped particle in the plane, which makes application objects of the optical tweezer system richer, and effectively solves the problem that the rod-shaped particle is difficult to be controlled by the existing optical tweezer system.

10 Claims, 3 Drawing Sheets

(58) Field of Classification Search
USPC .......................................................... 250/251
See application file for complete search history.

(56) References Cited

FOREIGN PATENT DOCUMENTS

| CN | 105629454 A | 6/2016 |
| CN | 106908946 A | 6/2017 |
| CN | 111175969 A | 5/2020 |

* cited by examiner

VORTEX-PAIR BEAM BASED OPTICAL TWEEZER SYSTEM

CROSS REFERENCE TO RELATED APPLICATION

This patent application claims the benefit and priority of Chinese Patent Application No. 202010005566.9 filed on Jan. 3, 2020 and entitled "VORTEX-PAIR BEAM BASED OPTICAL TWEEZER SYSTEM", which is incorporated by reference herein in its entirety.

TECHNICAL FIELD

The present disclosure relates to the technical field of optics, and in particular, to a vortex-pair beam based optical tweezer system.

BACKGROUND ART

Optical tweezer technology is to use a strongly focused laser beam as a light source, and when laser irradiates on a particle, the laser will produce a radiation force acting on the particle, so as to trap and manipulate the particle. Its principle is relatively simple, i.e. a laser beam is highly focused as the light source of optical tweezers. The focused beam will trap the particle through a formed potential well, and can also manipulate the particle to realize the operations of rotating, etc. Compared with many micromanipulation technologies, for example, atomic force microscopes and scanning probe microscopes, the optical tweezers have outstanding advantages. In particular, the optical tweezers do not need to be in contact with the particle when manipulating the particle, so as to avoid the damage to the particle. This advantage is more outstanding in the fields of biomedical science, etc.

The initial optical manipulation is realized by using the gradient force of a fundamental mode Gaussian beam. With the emergence of some novel structured light fields, these novel structured light fields are also used in optical trapping operations. The most typical one is a Laguerre Gaussian beam. When the vortex beam is used as optical tweezers, the vortex beam carries orbital angular momentum during propagation, so angular momentum and linear momentum will be exchanged between the vortex beam and the particle when the vortex beam is strongly focused and then irradiates on the particle. Analyzing from the prospective of force, the beam applies a force to the particle, so that the particle can be controlled to rotate. A gradient force will be formed by highly focusing the vortex beam. When this force reaches the magnitude of pN, the particle can be firmly trapped by this force, which can also manipulate the movement of the particle. Meanwhile, a tiny particle is trapped close to a focus due to a highly focused light trapping force. The particle is in a suspended state, the central light intensity of the vortex beam is zero, which will not cause damage to the particle. This is a great advantage compared with the traditional optical tweezers. Not only the particle with the refractive index greater than that of surrounding media, but also the particle with the refractive index less than that of the surrounding media can be trapped by taking the vortex beam as the optical tweezers.

The acting process of the optical tweezers and the particle is that: the laser beam needs to be focused firstly, and then the focused light irradiates on the particle to be acted. In such a manner, the beam and the particle interact with each other due to the existence of the particle, and meanwhile, the orbital angular momentum of the beam is changed. The particle gets momentum from the beam because forces interact with one another, so the particle can move, rotate, or the like. In the acting process, there are two types of forces. One is the gradient force, which refers to the acting force on the particle due to refraction, and the direction points to the focus center of the beam; the other is a scattering force, which refers to the acting force on the particle due to reflection of the beam. The direction of the scattering force is along the propagation direction of a trapping beam. The component of the gradient force in the transverse direction can pull the particle to the focus center of the trapping beam. Meanwhile, the other component of the gradient force, namely the axial component, reaches a balance with the scattering force at a specified position of a focus center of the trapping beam. In such a manner, the particle can be trapped in three dimensions.

Momentum will be transferred to the particle in the acting process of the vortex beam, and the particle will rotate because the vortex beam has the orbital angular momentum during propagation. The orbital angular momentum of light will be transferred to the particle due to the existence of the orbital angular momentum, causing the particle to revolve on a bright ring. To a certain extent, this rotation is uncontrollable, and is not desired on the manipulation of some particles.

The objects trapped by early optical tweezers are often spherical. However, it is difficult to realize the trapping of non-spherical particles. To obtain controllable trap of a multi-particle or non-spherical particle, such as a rod-shaped particle, by a single beam is desired, but there are often the disadvantages of complex optical device, great operation difficulty, low controllability, and so on.

SUMMARY

The objective of the present disclosure is to provide a vortex-pair beam based optical tweezer system, which solves the problems in the prior art that relative positions of two particles cannot be regulated and controlled, and directional rotation of specially structural, such as strip-shaped, particles cannot be realized. The optical tweezer system can realize precise regulation, control, and positioning of two spherical particles at relative positions in a plane, and any controllable rotation operation of a rod-shaped particle in the plane, which makes the application objects of the optical tweezer system richer, and effectively solves the problem that the rod-shaped particle is difficult to be controlled by the existing optical tweezer system.

In order to achieve the above-mentioned objective, the present disclosure provides a vortex-pair beam based optical tweezer system, including a laser device, a collimating and beam expanding system, a spatial light modulator, a confocal beam shrinking system, a sample table, and an observation unit arranged according to a light path. The spatial light modulator continuously loads different vortex pair phase diagrams, and outputs a single vortex-pair beam to realize real-time manipulation of a particle.

The vortex pair phase diagram is calculated through formula (1):

$$\phi(u,v) = \left(\frac{u-a+iv}{\sqrt{(u-a)^2+v^2}}\right)^{m_1} \left(\frac{u+a+iv}{\sqrt{(u+a)^2+v^2}}\right)^{m_2} \quad (1)$$

Where, ϕ represents a phase; $m_1$, $m_2$ are any two equal integers, called topological charges; a represents the off-axis distance of phase singularities of double vortices, and is any real number; u represents a horizontal coordinate; v represents a longitudinal coordinate; i represents an imaginary unit.

The vortex pair phase diagram calculated by formula (1) is loaded in the spatial light modulator. The spatial light modulator outputs a single vortex-pair beam, and two particles can be trapped simultaneously by using two symmetrical trapping areas of the single vortex-pair beam after being focused on a focal plane. Different vortex pair phase diagrams are obtained by regulating the topological charges $m_1$, $m_2$ or the off-axis distance a in formula (1). The spatial light modulator continuously loads different vortex pair phase diagrams in real time, so that real-time precise control of the relative distance of the two particles can be realized.

When $m_1$, $m_2$ increase simultaneously, the distance of the vortex-pair beam between double light spots on a focal plane can be increased, so as to increase the distance between the two trapped particles; when a increases, the distance of the vortex-pair beam between the double light spots on the focal plane is decreased, so as to decreased the distance between the two trapped particles.

a is 0.1 to 1 time the waist radius of an incident beam entering the spatial light modulator. In this range, the off-axis distance a and the change of the distance between the particles are in a linear relationship.

Preferably, a is 0.1 to 1 time the waist radius of the incident beam of the spatial light modulator.

Preferably, a horizontal coordinate and a longitudinal coordinate in the vortex pair phase diagram are calculated according to formula (2):

$$\begin{cases} u = u_0 \cos \theta(t) + v_0 \sin \theta(t) \\ v = -u_0 \sin \theta(t) + v_0 \cos \theta(t) \end{cases} \quad (2)$$

Where, u represents the horizontal coordinate; v represents the longitudinal coordinate; $u_0$ represents an initial horizontal coordinate; $v_0$ represents an initial longitudinal coordinate; θ(t) represents a rotation angle, and is a time function; t represents a time parameter.

The horizontal coordinate and the longitudinal coordinate can be rotated through formula (2). A rotated vortex pair phase diagram is obtained by putting the rotated coordinates into formula (1) to calculate, and is loaded to the spatial light modulator, so that the position rotation of the two trapped particles in the plane can be realized. The change of the two particles at any angle and any relative distance in the plane can be realized by regulating the topological charges $m_1$, $m_2$ or the off-axis distance in the formula (1). On the other hand, precise control of the rotation speed and the relative position change speed of the two particles can be realized by controlling the time parameter t or the speed of loading the phase diagram by the spatial light modulator, which has the characteristics of high precision, high stability, and convenience in operation.

The spatial light modulator in the optical tweezer system of the present disclosure loads the vortex pair phase diagram, and can also trap and lock a non-spherical, such as rod-shaped, particle by using two symmetrical trapping areas, on a focal plane, of the single vortex-pair beam after being focused. Controllable directional rotation of the rod-shaped particle is realized by regulating the parameter θ(t) in formula (2), which solves the problem about realizing the directional rotation on the specially structural, such as strip-shaped, particles in the prior art. In addition, the rotation speed can be regulated and controlled, the precision is high, and the stability is high, which makes the application objects of the optical tweezer system richer.

Preferably, the range of θ(t) is 0 to 360°, and the maximum rotational angular speed is 60° per second.

Preferably, the collimating and beam expanding system includes a half-wave plate, a polarization beam splitting prism, a high-reflectivity mirror, and a beam expanding lens system in sequence according to the setting of the light path;

the half-wave plate is fixed to a rotatable optical lens frame; the rotation of the half-wave plate around an optical axis changes the polarization direction of incident laser;

the polarization beam splitting prism reflects light s and enables light p to pass through a dielectric beam splitting film to separate polarized light s from polarized light p; the optical power of output light is changed by rotating the half-wave plate and combining the polarization beam splitting prism;

the high-reflectivity mirror is used for changing the light path, and reflecting the beam to the beam expanding lens system;

the beam expanding lens system expands the radius of a light spot of the beam and realizes the collimation of the beam, which is beneficial to covering a liquid crystal panel of the spatial light modulator by the light spot, and fully utilizing the modulation performance of the spatial light modulator;

the spatial light modulator is connected to a computer, and is used for loading different vortex pair phase diagrams for the spatial light modulator through a control program of the computer to realize precise regulation, control, and positioning of the particle;

the confocal beam shrinking system includes a first lens, a second lens, a beam splitter, and an objective lens in sequence according to the setting of the light path; the first lens, the second lens, and the beam splitter are used for shrinking the light spot of the vortex-pair beam generated by modulation of the spatial light modulator, so that light spot can completely enter the aperture of the objective lens; the objective lens is used for focusing the shrinked light spot onto the sample table; the sample table is a two-dimensional electric control displacement table, which can precisely find and position a particle that needs to be trapped;

the observation unit includes a visible light source, a focusing lens, and a CCD detector; a light filter is arranged in front of the focusing lens and is used for filtering the incident laser, so as to prevent the incident laser from affecting the imaging of the CCD detector.

Preferably, the half-wave plate can rotate around the optical axis.

Preferably, the spatial light modulator superposes a blazed grating phase diagram, and a diaphragm is arranged behind the spatial light modulator.

Preferably, the output power of the laser device is more than 400 mW; the wavelength of the laser device is 533 to 1064 nm.

Preferably, the wave band of the modulated light of the spatial light modulator is 450 to 1064 nm.

According to the specific embodiments provided by the present disclosure, the present disclosure discloses the following technical effects:

(1) The optical tweezer system of the present disclosure can simultaneously trap two particles by only using a single vortex-pair beam; the relative distance between the two particles can be regulated and controlled at the positions of any angle and any direction in a plane in real time.

(2) The optical tweezer system of the present disclosure rotates a beam by rotating a loaded modulation phase diagram, so as to realize controllable directional rotation of a specially structural, such as non-spherical, particle, such as a rod-shaped particle at any angle in the plane. The precision is high, and the stability is high.

(3) The optical tweezer system of the present disclosure is simple in design, high in control precision, and simple and flexible in operation, and has strong controllability on a trapping effect of the particle, which greatly expands the application range of optical tweezers, particularly, the trapping of the particles, such as the rod-shaped particle, with irregular shapes, and can be promoted and applied in biological field.

BRIEF DESCRIPTION OF THE DRAWINGS

To describe the technical solutions in the embodiments of the present disclosure or in the prior art more clearly, the following briefly describes the accompanying drawings required for describing the embodiments. Apparently, the accompanying drawings in the following description show merely some embodiments of the present disclosure, and those of ordinary skill in the art may still derive other drawings from these accompanying drawings without creative efforts.

Figure 1:
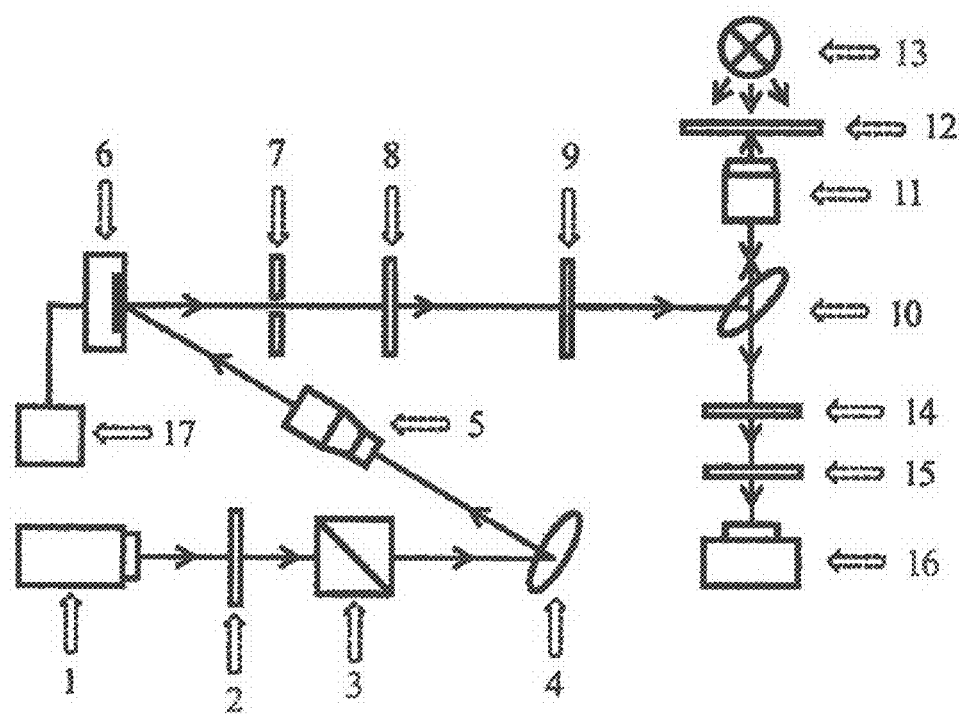
FIG. 1 is a light path diagram of an optical tweezer system of the embodiments of the present disclosure.

Reference signs in drawings: 1—laser device; 2—half-wave plate; 3—polarization beam splitting prism; 4—high-reflectivity mirror; 5—beam expanding lens system; 6—spatial light modulator, 7—diaphragm; 8—first lens; 9—second lens; 10—beam splitter; 11—objective lens; 12—sample table; 13—visible light source; 14—light filter; 15—focusing lens; 16—CCD detector; 17—computer.

DETAILED DESCRIPTION OF THE EMBODIMENTS

The technical solutions in the embodiments of the present disclosure will be clearly and completely described herein below with reference to the accompanying drawings in the embodiments of the present disclosure. Apparently, the described embodiments are merely part rather than all of the embodiments of the present disclosure. On the basis of the embodiments of the present disclosure, all other embodiments obtained by those of ordinary skill in the art without creative work fall within the protection scope of the present disclosure.

The objective of the present disclosure is to provide a vortex-pair beam based optical tweezer system, which solves the problems in the prior art that relative positions of two particles cannot be regulated and controlled, and directional rotation of specially structural, such as strip-shaped, particles cannot be realized. The optical tweezer system can realize precise regulation, control, and positioning of two spherical particles at relative positions in a plane, and any controllable rotation operation of a rod-shaped particle in the plane, which makes the application objects of the optical tweezer system richer, and effectively solves the problem that the rod-shaped particle is difficult to be controlled by the existing optical tweezer system.

In order to make the above objective, features, and advantages of the present disclosure more apparent and more comprehensible, the present disclosure is further described in detail below with reference to the accompanying drawings and specific vortex-pair beam in emergent light of the spatial light modulator.

The vortex-pair beam emitted from the spatial light modulator 6 passes through the diaphragm 7 to pick out the first order diffraction light and block other orders of light. The first order diffraction light is the vortex-pair beam of a target, and radius of the beam is reduced through the first lens 8 and the second lens 9, so that the light spot completely enters the aperture of the objective lens 11. Then, the vortex-pair beam is reflected to the objective lens 11 through the reflection of the beam splitter 10. The vortex-pair beam is focused to a sample to be tested on the sample table 12 through the objective lens 11. The sample table 12 is a two-dimensional electric control table, which can precisely move and position the particle that needs to be trapped.

The sample to be tested on the sample table 12 is illuminated through the visible light source 13, and the light of the light source is focused and imaged on the CCD detector 16 by the focusing lens 15 after being filtered through the light filter 14. The light filter 14 is arranged in front of the focusing lens 15 and is used for filtering the incident laser, so as to prevent the incident laser from affecting the imaging of the CCD detector 16.

In the following embodiments, the laser device 1 is a high-power semiconductor continuous laser device with the wavelength of 533 nm, and has the maximum output power of 2 W. The power can meet the requirement of enough trapping force when trapping the particle. The laser device adopts the laser device with the model number of MW-GL-532/2000 mW-16060208 of Changchun Leishi Photoelectric Technology Co., LTD.

The beam expanding lens system 5 adopts a GCO-25 series contact zoom beam expanding lens of Daheng Photoelectric Technology Company, and has the model number of GCO-2503.

The spatial light modulator 6 adopts a spatial light modulator with the model number of PLUTO-2-VIS-056 of Holoeye Company. The wave band of the modulated light is 450 to 650 nm, and the reflectivity is greater than 93%.

The objective lens 11 has the aperture NA=1.25, and the magnification of 100. The objective lens adopts the lens with the model number of CFI Achromat 100× OilA N.A.1.25 of Nikon Corporation. The light filter adopts the light filter with the model number of Thorlab FD1M.

Embodiment 1

The laser device 1 emits a linearly polarized beam with the wavelength of 533 nm. After the linearly polarized beam passes through the half-wave plate 2 and the polarization beam splitting prism 3, the polarization direction of the beam is horizontally polarized, and the light intensity suitable for trapping the particle is regulated by rotating the half-wave plate 2. The beam passes through the high-reflectivity mirror 4 to change its propagation direction and enters the beam expanding lens system 5; the beam size is expanded twice by the beam expanding lens system 5; the diameter of the spot after the beam is expanded is about 3 mm, which can cover a liquid crystal panel of the spatial light modulator 6.

The beam expanded by the beam expanding lens system 5 enters the spatial light modulator 6. The spatial light modulator 6 is controlled to load a vortex pair phase diagram in real time by the computer 17. The vortex-pair beam modulated by the spatial light modulator 6 passes through the diaphragm 7 to pick out the first order diffraction light. The beam is shrinked by the first lens 7 and the second lens 8, where the beam shrinking ratio is 80%.

The shrinked vortex-pair beam is reflected to enter the objective lens 11 by the beam splitter 10. The laser is focused in the sample to be tested on the sample table 12. The particle can be moved and trapped by moving the sample table 12. The visible light source 13 illuminates the sample to be tested on the sample table 12, the light passes through the light filter 14 to filter the laser with the wavelength of 533 nm, and then is focused on the CCD detector 16 through the focusing lens 15.

The spatial light modulator 6 is controlled by the computer 17 to load an initial phase diagram of the vortex-pair beam and superposes the blazed grating phase diagram. The first order diffraction light is picked out through the diaphragm 7, and the diffracted first order diffraction beam is the vortex-pair beam that we need. Precise control and rotation of two particles can be realized by loading the vortex pair phase diagram in real time. The vortex pair phase diagram is calculated through formula (1):

$$\phi(u,v) = \left(\frac{u-a+iv}{\sqrt{(u-a)^2+v^2}}\right)^{m_1} \left(\frac{u+a+iv}{\sqrt{(u+a)^2+v^2}}\right)^{m_2} \quad (1)$$

Where, $\phi$ represents a phase, $m_1$, $m_2$ are any two equal integers, called topological charges; a represents the off-axis distance of phase singularities of double vortices, and is any real number, u represents a horizontal coordinate; v represents a longitudinal coordinate; i represents an imaginary unit.

Figure 2:
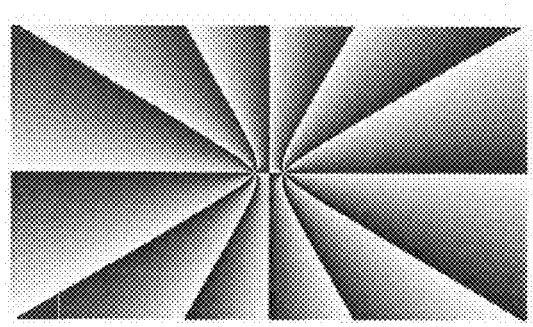
FIG. 2 is a vortex pair phase diagram when a=0.45 mm, $m_1$=6, and $m_2$=6.
Figure 3:
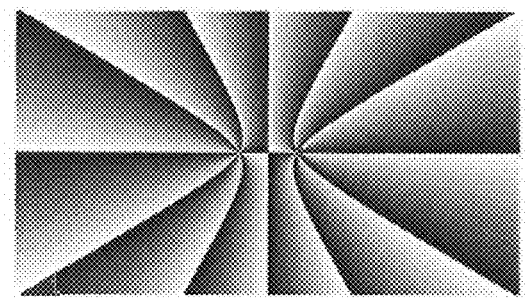
FIG. 3 is a vortex pair phase diagram when a=0.9 mm, $m_1$=6, and $m_2$=6.

The initial phase diagram of the vortex-pair beam is as shown in FIG. 2, where a=0.45 mm, $m_1$=6, and $m_2$=6. The phase diagram of the vortex-pair beam is as shown in FIG. 3 by keeping $m_1$, $m_2$ unchanged and continuously increasing the off-axis distance parameter a to a=0.9 mm, where a=0.9 mm, $m_1$=6, and $m_2$=6.

Figure 4A:
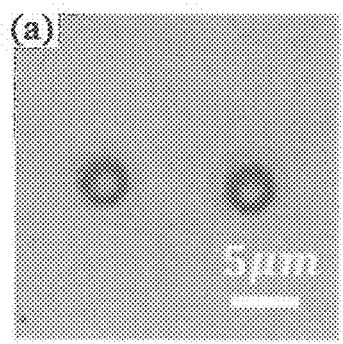
FIG. 4 is a trapping effect diagram of the optical tweezer system on two spherical particles, where in (a), a=0.45 mm; in (b), a=0.9 mm.
Figure 4B:
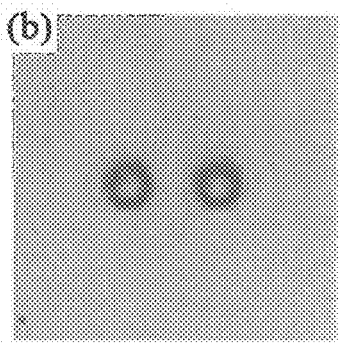

In the phase diagram loaded by the spatial light modulator, when $m_1$=6, $m_2$=6, and a=0.45 mm, the trapping effect diagram of the optical tweezer system on a spherical particle is as shown in (a) of FIG. 4, and controllable distance operation of the two spherical particles in the transverse direction can be realized by adjusting 8 in the phase diagram. When $m_1$=6, $m_2$=6, and a=0.9 mm, the trapping effect diagram of the optical tweezer system on a spherical particle is as shown in (b) of FIG. 4, and the transverse distance between two spherical particles is shortened.

Figure 5:
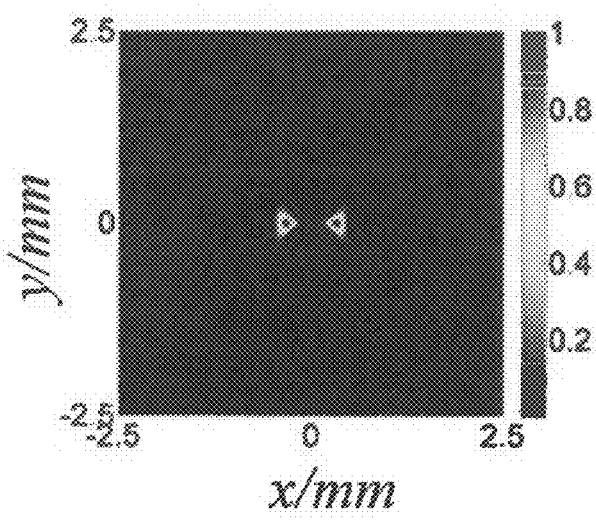
FIG. 5 is a theoretical light intensity distribution diagram of a vortex-pair beam after being focused through a lens with the focal length of 500 mm on a focal plane, $m_1$=6, $m_2$=6, and a=0.9 mm.

FIG. 5 is a theoretical light intensity distribution diagram of a vortex-pair beam on a focal plane after being focused through a lens with the focal length of 500 mm, the parameters are that $m_1$=6, $m_2$=6, and a=0.9 mm.

Embodiment 2

By using the same optical tweezer system as Embodiment 1, the vortex pair phase diagram loaded by the spatial light modulator is calculated through formula (1):

$$\phi(u,v) = \left(\frac{u-a+iv}{\sqrt{(u-a)^2+v^2}}\right)^{m_1} \left(\frac{u+a+iv}{\sqrt{(u+a)^2+v^2}}\right)^{m_2} \quad (1)$$

Where, $\phi$ represents a phase, $m_1$, $m_2$ are any two equal integers, called topological charges; a represents the off-axis distance of phase singularities of double vortices, and is any real number, u represents a horizontal coordinate; v represents a longitudinal coordinate; i represents an imaginary unit.

The horizontal coordinate and the longitudinal coordinate in the vortex pair phase diagram are calculated according to formula (2):

$$\begin{cases} u = u_0 \cos\theta(t) + v_0 \sin\theta(t) \\ v = -u_0 \sin\theta(t) + v_0 \cos\theta(t) \end{cases} \quad (2)$$

Where, u represents the horizontal coordinate; v represents the longitudinal coordinate; $u_0$ represents an initial horizontal coordinate; $v_0$ represents an initial longitudinal coordinate; $\theta$ represents a rotation angle, and is a time function; t represents a time parameter.

Figure 6:
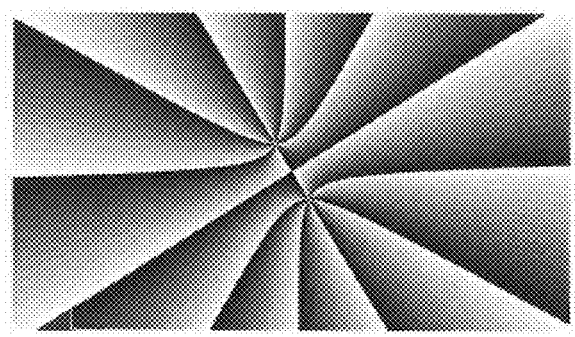
FIG. 6 is a vortex pair phase diagram after the vortex-pair beam is rotated 120°, a=0.9 mm, $m_1$=6, $m_2$=6, and $\theta(t)$=120°.
Figure 7A:
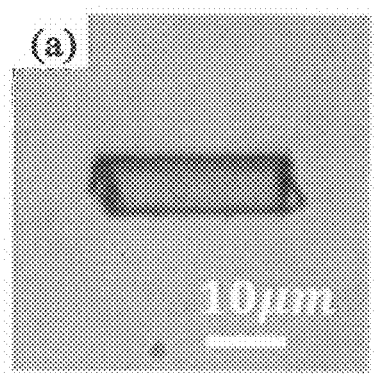
FIG. 7 is a trapping effect diagram of the optical tweezer system on a rod-shaped particle, where in (a), a=0.9 mm, $m_1$=6, $m_2$=6, and $\theta(t)$=0°; in (b), a=0.9 mm, $m_1$=6, $m_2$=6, and $\theta(t)$=120°.
Figure 7B:
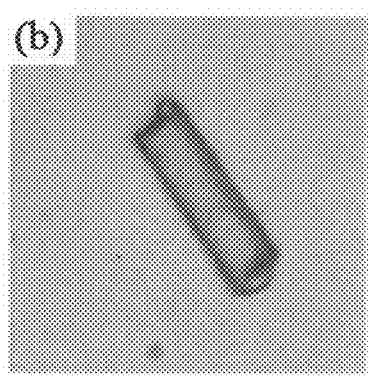

By taking the phase diagram in which $m_1$=6, $m_2$=6, a=0.9 mm, and $\theta(t)$=0° as the initial phase diagram, the trapping effect diagram of the optical tweezer system on a rod-shaped particle is as shown in (a) of FIG. 7. The rod-shaped particle is horizontal and transverse;

the rotation angle in formula (2) is adjusted, and when $\theta(t)$=120°, and other parameters are unchanged, the rotated vortex pair phase diagram is as shown in FIG. 6; controllable directional rotation of the rod-shaped particle is realized, as shown in (b) of FIG. 7, the rod-shaped particle is rotated 120° counterclockwise.

The range of $\theta(t)$ is 0 to 360°. Any rotation of the vortex-pair beam at 360°, including external rotational angular speed, or the rotation of a specially structural, such as non-spherical, particle at any angle in 360° can be realized. The maximum rotational angular speed is 60° per second. The phase diagrams at different rotation angles can be prepared by changing the time parameter t, so as to realize speed-controllable rotation of the rod-shaped particle. The optical tweezer system has extremely high precision, high stability, and convenience in operation.

Various embodiments in the present specification are described in a progressive manner. Each embodiment focuses on differences from other embodiments, and the same and similar parts of various embodiments may be referred to one another.

Herein, specific examples are used to describe the principle and implementation manners of the present disclosure. The description of the embodiments above is merely intended to help understand the method and its core idea of the present disclosure. In addition, those of ordinary skill in the art may make modifications based on the idea of the present disclosure with respect to the specific implementation manners and the application scope. In conclusion, the contents of the present specification shall not be construed as a limitation to the present disclosure.

What is claimed is:

1. A vortex pair beam based optical tweezer system, comprising a laser device, a collimating and beam expanding system, a spatial light modulator, a confocal beam shrinking system, a sample table, and an Observation unit arranged according to a light path, wherein the spatial light modulator continuously loads different vortex pair phase diagrams, and outputs a single vortex-pair beam to realize real-time manipulation of a particle;

a vortex pair phase diagram is calculated through formula (1):

$$\phi(u, v) = \left(\frac{u - a + iv}{\sqrt{(u-a)^2 + v^2}}\right)^{m_1} \left(\frac{u + a + iv}{\sqrt{(u-a)^2 + v^2}}\right)^{m_2} \quad (1)$$

wherein, $\phi$ represents a phase, $m_1$, $m_2$ are any two equal integers, called topological charges; a represents the off-axis distance of phase singularities of double vortices, and is any real number; u represents a horizontal coordinate; v represents a longitudinal coordinate; i represents an imaginary unit.

2. The vortex-pair beam based optical tweezer system according to claim 1, wherein a is 0.1 to 1 time the waist radius of an incident beam of the spatial light modulator.

3. The vortex-pair beam based optical tweezer system according to claim 1, wherein a horizontal coordinate and a longitudinal coordinate in the vortex pair phase diagram are calculated according to formula (2):

$$\begin{cases} u = u_0\cos\theta(t) + v_0\sin\theta(t) \\ v = -u_0\sin\theta(t) + v_0\cos\theta(t) \end{cases} \quad (2)$$

wherein, u represents the horizontal coordinate; v represents the longitudinal coordinate; $u_0$ represents an initial horizontal coordinate; $v_0$ represents an initial longitudinal coordinate; $\theta(t)$ represents a rotation angle, and is a time function; t represents a time parameter.

4. The vortex-pair beam based optical tweezer system according to claim 3, wherein the range of $\theta(t)$ is 0 to 360', and the maximum rotational angular speed is 60' per second.

5. The vortex-pair beam based optical tweezer system according to claim 1, wherein the collimating and beam expanding system comprises a half-wave plate, a polarization beam splitting prism, a high-reflectivity mirror, and a beam expanding lens system in sequence according to the setting of the light path;

the confocal beam shrinking system comprises a first lens, a second lens, a beam splitter, and an objective lens in sequence according to the setting of the light path;

the observation unit comprises a visible light source, a focusing lens, and a CCD detector.

6. The vortex-pair beam based optical tweezer system according to claim 5, wherein the half-wave plate can rotate around an optical axis.

7. The vortex-pair beam based optical tweezer system according to claim 5, wherein the half-wave plate is fixed to a rotatable optical lens frame; the polarization direction of incident laser is changed by rotating the half-wave plate around the optical axis;

the polarization beam splitting prism reflects light s and enables light p to pass through a dielectric beam splitting film to separate polarized light s from polarized light p; the optical power of output light is changed by rotating the half-wave plate and combining the polarization beam splitting prism;

the high-reflectivity mirror is used for changing the light path, and reflecting the beam to the beam expanding lens system;

the beam expanding lens system expands the radius of a light spot of the beam and realizes the collimation of the beam;

the spatial light modulator is connected to a computer, and loads different vortex pair phase diagrams for the spatial light modulator through a control program of the computer to realize precise regulation, control, and positioning of the particle;

a first lens, a second lens, and a beam splitter are used for shrinking the light spot of the vortex-pair beam generated by the modulation of the spatial light modulator, so that the light spot can completely enter the aperture of the objective lens; the objective lens is used for focusing the shrinked light spot onto the sample table; the sample table is a two-dimensional electric control displacement table;

a light filter is arranged in front of the focusing lens and is used for filtering incident laser.

8. The vortex-pair beam based optical tweezer system according to claim 1, wherein the spatial light modulator superposes a blazed grating phase diagram, and a diaphragm is arranged behind the spatial light modulator.

9. The vortex-pair beam based optical tweezer system according to claim 1, wherein the output power of the laser device is more than 400 mW; the wavelength of the laser device is 533 to 1064 nm.

10. The vortex-pair beam based optical tweezer system according to claim 1, wherein the wave hand of the modulated light of the spatial light modulator is 450 to 1064 nm.

\* \* \* \* \*